United States Patent
Marupaduga (10) Patent No.: US 11,272,523 B1
(45) Date of Patent: Mar. 8, 2022

(54) COOPERATIVE USE OF NON-STANDALONE CONNECTIVITY AND REMAINING BATTERY ENERGY TO CONTROL AIR-INTERFACE-RESOURCE SCHEDULING PRIORITY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 84 days.

(21) Appl. No.: 16/858,235

(22) Filed: Apr. 24, 2020

(51) Int. Cl.
  *H04W 72/12* (2009.01)
  *H04W 88/10* (2009.01)
  *H04W 92/10* (2009.01)

(52) U.S. Cl.
  CPC ... *H04W 72/1247* (2013.01); *H04W 72/1284* (2013.01); *H04W 88/10* (2013.01); *H04W 92/10* (2013.01)

(58) Field of Classification Search
  CPC ......... H04W 72/1247; H04W 72/1284; H04W 88/10; H04W 92/10
  See application file for complete search history.

(56) References Cited

U.S. PATENT DOCUMENTS

| | | | |
|---|---|---|---|
| 6,108,316 A | 8/2000 | Agrawal | |
| 2004/0180701 A1* | 9/2004 | Livet | H04W 52/0261 455/574 |
| 2010/0020734 A1 | 1/2010 | Nakagawa et al. | |
| 2010/0173667 A1* | 7/2010 | Hui | H04W 72/048 455/552.1 |
| 2010/0190505 A1 | 7/2010 | Shiizaki et al. | |
| 2012/0108282 A1 | 5/2012 | Li et al. | |
| 2016/0095034 A1* | 3/2016 | Hampel | H04W 36/0058 370/331 |
| 2016/0242059 A1* | 8/2016 | Lopes | H04W 24/02 |
| 2020/0351792 A1* | 11/2020 | Ghelichi | H04W 52/027 |

OTHER PUBLICATIONS

First Action Interview Pilot Program Pre-Interview Communication from U.S. Appl. No. 15/043,835, dated Jul. 11, 2017.
First Action Interview Office Action from U.S. Appl. No. 15/043,835, dated Dec. 15, 2017.

* cited by examiner

Primary Examiner — Tejis Daya (57) ABSTRACT

A method and system to control air-interface-resource scheduling priority of a user equipment device (UE) served by an access node over an air interface, where the air interface defining air-interface resources such as physical resource blocks (PRBs) allocable by the access node. In an example method, the access node detects that both (i) the UE has threshold low remaining battery energy and (ii) the UE is served with non-standalone connectivity, such as EN-DC, rather than with standalone connectivity, such as 4G-only or 5G-only. And based at least on that detecting, the access node transitions from serving the UE with a baseline air-interface scheduling priority to serving the UE instead with an increased air-interface scheduling priority higher than the baseline scheduling priority.

20 Claims, 5 Drawing Sheets

COOPERATIVE USE OF NON-STANDALONE CONNECTIVITY AND REMAINING BATTERY ENERGY TO CONTROL AIR-INTERFACE-RESOURCE SCHEDULING PRIORITY

BACKGROUND

A cellular wireless network typically includes a number of access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide a respective cell defined on a radio-frequency (RF) carrier, which could be frequency division duplex (FDD), with separate frequency channels for downlink and uplink communication, or time division duplex (TDD), with a single frequency channel multiplexed over time between downlink and uplink use. Each such frequency channel could be characterized by a center frequency and particular bandwidth (width of frequency) centered on that center frequency and thus ranging from a low-end frequency to a high-end frequency.

On the downlink and uplink channels, the air interface of each such cell could be configured in a specific manner to define physical resources for carrying information wirelessly between the access node and UEs.

In a non-limiting example implementation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink of the example air interface could be grouped to define physical resource blocks (PRBs) that could be allocated as needed to carry data between the access node and served UEs.

Depending on the carrier bandwidth and configuration of these PRBs, each subframe might thereby define a certain number of these PRBs. For instance, in a representative arrangement, a channel bandwidth of 100 Megahertz (MHz) might define 50 PRBs per subframe, and a channel bandwidth of 20 MHz might define 100 PRBs per subframe.

In addition, certain resources on the downlink and/or uplink of each such cell could be reserved for special purposes. For instance, on the downlink, certain resources could be reserved to carry synchronization signals that UEs could detect as an indication of coverage, other resources could be reserved to carry a reference signal that UEs could measure in order to determine coverage strength, still other resources could be reserved to carry other downlink control-plane signaling from the access node to UEs, and other resources could be reserved to carry scheduled user-plane communications from the access node to UEs. And on the uplink, certain resources could be reserved to carry uplink control-plane signaling from UEs to the access node, and other resources could be reserved to carry scheduled user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling, via the access node, with a core-network controller to attach and thus register for service, and the core-network controller and access node could coordinate setup for the UE of a user-plane bearer, including an access-bearer that extends between the access node and a core-network gateway system providing connectivity with a transport network and a data-radio-bearer (DRB) that extends over the air between the access node and the UE.

Once the UE is connected and attached, the access node could then serve the UE with packet-data communications.

For instance, when the core-network gateway system receives packet data for transmission to the UE, the data could flow over the UE's access bearer to the access node, and the access node could buffer the data, pending transmission of the data over the UE's DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs. Further, to facilitate this downlink communication, the UE could regularly monitor every downlink subframe for the presence of any such scheduling directive to the UE. And upon detecting and reading the scheduling directive, the UE could then read the transmitted data from the indicated PRBs.

Likewise, on the uplink, when the UE has packet data for transmission on the transport network, the UE could buffer the data, pending transmission of the data over the UE's DRB to the access node, and the UE could transmit to the access node a scheduling request that carries a buffer status report (BSR) indicating the quantity of data that the UE has buffered for transmission. With the example air-interface configuration, the access node could then allocate uplink PRBs in an upcoming subframe to carry at least some of the data from the UE and could transmit to the UE a scheduling directive indicating those upcoming PRBs. Similarly here, the UE could monitor each downlink subframe for the presence of such a scheduling directive. And upon detecting and reading the scheduling directive, the UE could accordingly transmit the data to the access node in the indicated PRBs.

For such scheduled downlink or uplink communication on PRBs, the access node and UE could use a modulation and coding scheme (MCS) that is selected based on the UE's wireless channel quality and that the access node specifies in its scheduling directive to the UE. In a representative implementation, the MCS could define a coding rate based on the extent of error-correction coding data or the like that would be transmitted together with the user-plane data being communicated, and a modulation scheme that establishes how many bits of data could be carried by each resource element. When channel quality is better, the access node may direct use of a higher-order MCS that has a higher coding rate (e.g., with more error-correction coding) and/or that supports more bits per resource element, and when channel quality is worse, the access node may direct use of a lower-order MCS that may have a lower coding rate and/or supports fewer bits per resource element.

Accordingly, the number of PRBs that would be required to transmit a given quantity of data over the air between the access node and the UE could vary based on the UE's channel quality. Namely, if and when the UE's channel quality is relatively good, fewer PRBs may be needed to communicate the data, since the data would be communicated using a higher-order MCS. Whereas, if and when the UE's channel quality is relatively poor, more PRBs would be needed to communicate the data, since the data would be communicated using a lower-order MCS.

In practice, the access node might also serve multiple connected UEs at once on a given carrier, and each UE may have respective channel quality and respective data-communication needs. As the access node's carrier has a limited quantity of PRBs per unit time (e.g., per subframe) based on the carrier's bandwidth, the access node might therefore apply a scheduling algorithm to help fairly allocate PRBs among the served UEs.

Various PRB scheduling algorithms are possible. In a most basic example arrangement, on a per subframe basis, the access node could apply round-robin scheduling in which the access node cycles through allocation of PRBs to the served UEs and thus provides equal PRB-scheduling priority to each UE. For instance, the access node might cyclically iterate through allocation of PRBs to the UEs until the access node has assigned all of the PRBs of the subframe, capping each UE's respective PRB allocation at the quantity of PRBs needed to carry the data buffered for the UE, considering the UE's channel quality and associated MCS. Further, in the access node could also apply a proportional-fairness process by which the access node increases the scheduling priority to a UE based on the UE having waited longer than other UEs to receive PRB allocation.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT ("first-RAT access node") and a second access node that provides service according to a second RAT ("second-RAT access node"), and a UE positioned within coverage of those access nodes could have a first radio configured to engage in service according to the first RAT and a second radio configured to engage in service according to the second RAT. With this arrangement, the UE may be able to establish a first air-interface connection with the first-RAT access node according to the first RAT and a second air-interface connection with the second-RAT access node according to the second RAT, and the access nodes may then concurrently serve the UE over those connections according to their respective RATs, each in the manner discussed above for instance.

Such dual connectivity, or "non-standalone" (NSA) connectivity, could help facilitate increased peak data-rate of communications, by multiplexing the UE's communications across the multiple air-interface connections. Further or alternatively, dual connectivity may provide other benefits compared with serving a UE on a single connection according to a single RAT, as "standalone" (SA) connectivity.

One technical issue with such dual-connectivity service, particularly for a UE that is battery powered, is that the dual-connectivity service could contribute to drain of the UE's battery energy. This problem could arise from having the UE operate concurrently on at least two separate connections, regularly monitoring downlink subframes for scheduling directives per connection, and engaging in scheduled communication respectively on each connection. Especially if the UE has separate radios and/or other RF components per connection, the UE's concurrent operation on multiple connections could thus consume more of the UE's battery energy than the UE's operation on just a single connection.

Further, this battery drain issue may be most significant for UEs that have low remaining battery energy in the first place. In particular, if a UE has low remaining battery energy and operates with dual connectivity, the UE's likely increased battery drain resulting at least in part from the UE operating with dual connectivity may ultimately exhaust the UE's battery energy, causing the UE to disable certain services, lose connectivity, or possibly shut down altogether, which would pose a user-experience problem.

The present disclosure provides a mechanism to help address this issue.

In accordance with the disclosure, when an access node is concurrently serving multiple connected UEs including a given UE, the access node will detect that (i) the given UE is operating with NSA connectivity rather than SA connectivity and (ii) the given UE's remaining battery energy is threshold low. And based at least on having detected both of those factors cooperatively, the access node will then increase the given UE's air-interface-resource scheduling priority to help expedite air-interface communication with the given UE.

In an example implementation, for instance, as the access node is concurrently serving each of multiple connected UEs, the access node could receive reports respectively from each UE indicating the UE's remaining battery energy or could receive such a report from a UE if and when the UE determines that its remaining battery energy is threshold low. Further, the access node could have a stored context record respectively for each served UE, indicating whether the UE is operating with NSA connectivity or rather with SA connectivity. When the access node receives from a UE a report indicating a remaining battery energy of the UE that is lower than a predefined low battery-energy threshold, the access node could then further determine from the UE's context record whether that UE is operating with NSA connectivity rather than SA connectivity. And based at least on determining both that the UE has the threshold low battery energy and that the UE is operating with NSA connectivity rather than SA connectivity, the access node could set itself to increase the UE's scheduling priority and could then accordingly apply for the UE the increased scheduling priority.

Increasing a UE's scheduling priority could involve giving the UE higher priority for air-interface resource allocation than the UE would otherwise receive. For example, with the round-robin scheduling discussed above, if the access node has 100 PRBs per subframe and is serving 5 UEs with roughly the same channel quality and data-communication needs as each other, the access node might normally allocate 20 PRBs per subframe to each UE, with a 1:1 ratio in which each UE receives one PRB per round-robin cycle. Increasing the scheduling priority for a given UE, however, might involve instead applying a 2:1 ratio for that UE, so that that UE receives two PRBs per round-robin cycle, resulting in the access node allocating, per subframe, 40 PRBs to that UE and 15 PRBs to each other UE. Other examples are possible as well.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE, 5G NR, and 4G-5G dual connectivity, referred to as EUTRA-NR Dual Connectivity (EN-DC). It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

Figure 1:
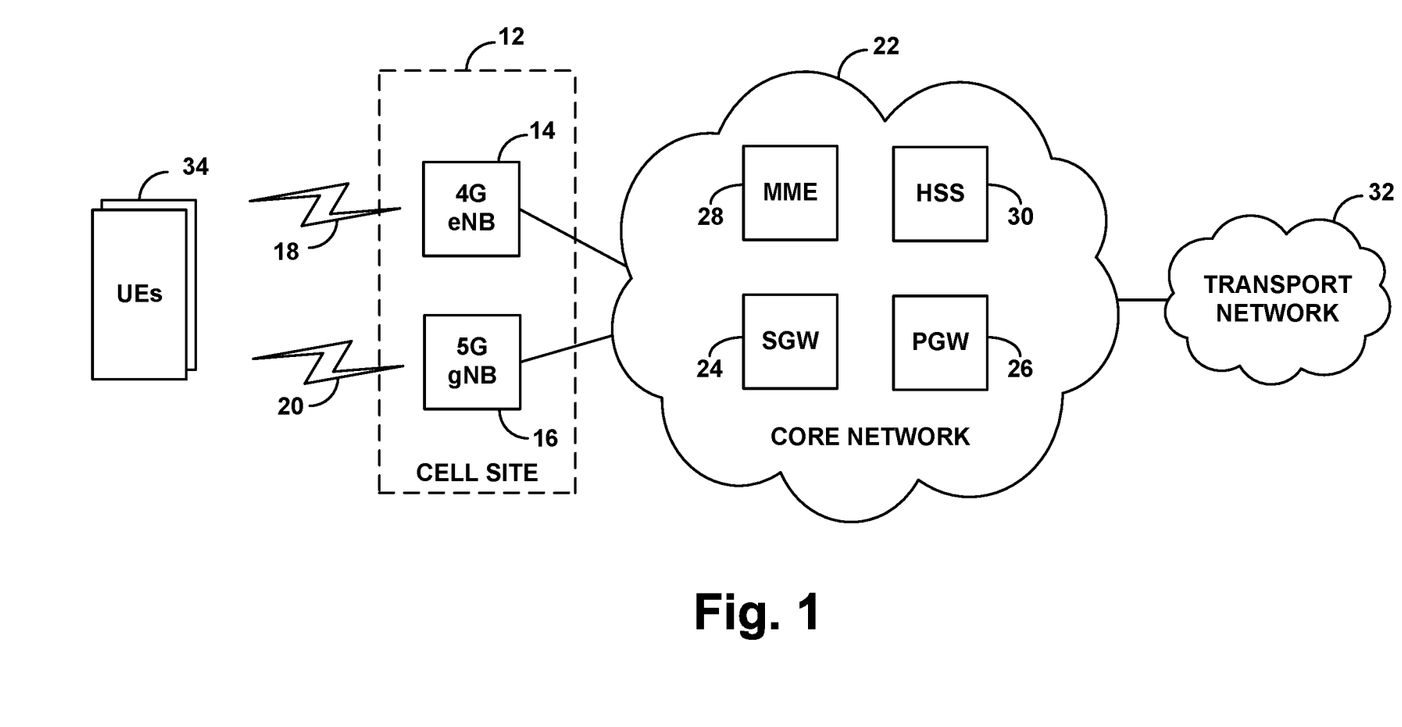
FIG. 1 is a simplified block diagram of an example network arrangement in which aspects of the present disclosure can be implemented.

FIG. 1 is a simplified block diagram depicting a representative arrangement including a cell site 12 having a 4G LTE access node (evolved Node-B (eNB)) 14 and a 5G NR access node (next generation Node-B (gNB)) 16. Each of these access nodes could be a macro access node of the type configured to provide a wide range of coverage or could take other forms, such as a small cell access node, repeater, a femtocell access node, or the like, possibly configured to provide a smaller range of coverage. Further, the access nodes could be collocated with each other and could provide coverage in largely the same direction as each other, to define an area in which UEs can engage in both 4G service provided by the 4G eNB 14 and 5G service provided by the 5G gNB 16.

Each access node could be configured to provide coverage and service on a respective carrier. Namely, the 4G eNB 14 could provide coverage and service on a 4G carrier 18, and the 5G gNB 16 could provide coverage and service on a 5G carrier 20. In representative 4G and 5G implementations, each such carrier could be FDD or TDD and could thus define separate downlink and uplink frequency channels or a single frequency channel multiplexed over time between downlink and uplink use. And as noted above, each such frequency channel could be characterized by its bandwidth and center frequency.

Further, the air interface on each carrier could be structured as described above by way of example, being divided over time into frames, subframes, timeslots, and symbol time segments, and over frequency into subcarriers, thus defining the array of air-interface resource elements grouped into PRBs allocable by the access node as noted above, for use to carry data to or from served UEs. 4G and 5G air-interfaces, however, might differ from each other in various ways now known or later developed, such as with one implementing variable subcarrier spacing and the other having fixed subcarrier spacing, with one having flexible TDD configuration and the other having fixed TDD configuration, with one having different subcarrier spacing and/or symbol time segment length than the other, and/or with one making different use of MIMO technologies than the other, among other possibilities.

As further shown, the 4G and 5G access nodes in the example arrangement are each connected with a core network 22, such as an Evolved Packet Core (EPC) network or Next Generation Core (NGC) network. In the example shown, the core network 22 includes a serving gateway (SGW) 24, a packet data network gateway (PGW) 26, and a mobility management entity (MME) 28, and a home subscriber server (HSS) 30, although other arrangements are possible as well.

Without limitation, each access node could have an interface with the SGW 24, the SGW 24 could have an interface with the PGW 26, and the PGW 26 could provide connectivity with a transport network 32. Further, each access node could have an interface with the MME 28, and the MME 28 could have an interface with the SGW 24, so that the MME 28 could coordinate setup of bearers for UEs to enable the UEs to engage in packet-data communication. And the HSS 30 could store UE profile records, which could specify service-subscription plans, UE configurations, and/or other such UE capability information.

FIG. 1 further depicts various example UEs 34 that may from time to time be within coverage of cell site 12 and may from time to time be served by either or both of the access nodes. In a representative implementation, each such UE might be configured to support 4G service and/or 5G service, and possibly EN-DC service. For instance, a UE may have a 4G LTE radio and associated logic and/or a 5G NR radio and associated logic. And if the UE is configured to support both 4G service and 5G service, the UE might further be configured to support EN-DC service.

As a result, from time to time, each access node might serve one or more UEs with SA connectivity and/or the access nodes might cooperatively serve one or UEs with NSA connectivity. For example, the 4G eNB 14 may from time to time serve some UEs with 4G-only connectivity, the 5G gNB 16 may from time to time serve some UEs with 5G-only connectivity, and the 4G eNB 14 and 5G gNB 16 might from time to time serve some UEs cooperatively with EN-DC.

In line with the discussion above, upon entering into coverage of cell site 12, a representative UE 34 might initially scan for coverage on a preferred RAT, such as 4G or 5G, and the UE could thereby discover threshold strong coverage of one of the access nodes. The UE could then engage in RRC signaling with that access node to establish a connection under the applicable RAT. And if appropriate, the UE could engage in attach signaling with the MME 28 through the UE's established RRC connection, and the MME could coordinate setup of one or more bearers for the UE. In addition, upon UE connection, the access node could establish in data storage for the UE a context record that indicates the connected state of the UE.

In relation to this attachment process, the access node could also transmit to the UE an RRC message carrying a UE-capability enquiry, and the UE could respond to the access node with an RRC message carrying a "UE capability information" information element (IE), which could indicate UE capabilities. Alternatively, the access node could receive such capability information from the MME 28, which could obtain the information from the HSS 30. The access node could then store the UE capability data the UE context record for reference while serving the UE.

Once the UE is so connected and attached, the access node could then serve the UE in an SA mode, i.e., with standalone connectivity under just the access node's RAT, in the manner described above. For instance, as the access node receives packet data for transmission to the UE, the access node could buffer the data pending transmission and could schedule and provide transmission of the data in downlink PRBs to the UE. And when the UE has data buffered for transmission and has sent a scheduling request to the access node, the access node could schedule transmission of the data in uplink PRBs to the access node, and the UE could transmit the data accordingly.

In an example implementation, if the access node with which the UE has so connected is the 4G eNB 14, the 4G eNB 14 could then learn from the UE's capability data that the UE is EN-DC capable, and the 4G eNB 14 could responsively configure EN-DC for the UE, so that the UE could be served concurrently over a 4G connection by the 4G eNB 14 and a 5G connection by the 5G gNB 16.

For instance, the 4G eNB 14 could first direct the UE to scan for and report coverage of the 5G gNB 16. And upon confirming that the UE is within good coverage of the 5G gNB 16, the 4G eNB 14 could then engage in an EN-DC setup process. An example EN-DC-setup process could involve the 4G eNB 14 signaling with the 5G gNB 16 to arrange for setup of the 5G connection for the UE, and the 4G eNB 14 signaling with the UE to cause the UE to access the newly established 5G connection. And the example EN-DC-setup process might also involve configuring setup of a split bearer for the UE, to enable some of the UE's data communication to be served by the 4G eNB 14 and other of the UE's data communication to be served by the 5G gNB 16. Further, the 4G eNB 14 and 5G gNB 16 could then each store in a context record for the UE an indication that the UE is operating with EN-DC connectivity rather than standalone connectivity.

With EN-DC so configured for the UE, the 4G eNB 14 and 5G gNB 16 could then serve the UE concurrently, each in the manner discussed above for instance. Namely, when the core network 22 has data for transmission to the UE, the 4G eNB 14 may receive, schedule, and provide transmission of a portion of the data to the UE on downlink PRBs of the UE's 4G connection, and the 5G gNB 16 may receive, schedule, and provide transmission of another portion of the data on downlink PRBs of the UE's 5G connection. And when the UE has data buffered for transmission, the 4G eNB 14 could schedule and the UE could provide transmission of a portion of that data on uplink PRBs of the UE's 4G connection, and the 5G gNB 16 could schedule and the UE could provide transmission of another portion of the data on uplink PRBs of the UE's 5G connection.

With this arrangement, as noted above, each access node may serve multiple connected UEs concurrently on a given carrier, and each access node may therefore apply a scheduling algorithm to fairly allocate PRBs to the UEs.

In normal operation, the scheduling algorithm may provide each UE with a baseline scheduling priority. For instance, with the round-robin scheduling process discussed above, all of the UEs connected with the access node on the carrier may have the same baseline scheduling priority as each other, so if the UEs are similarly situated (e.g., have similar quantities of data to be communicated and similar channel quality), the access node may end up allocating roughly the same quantity of PRBs per unit time to each UE. Alternatively, a given UE's baseline scheduling priority might be higher than another UE's baseline scheduling priority to accommodate proportional fairness scheduling and/or due to subscription contract and service level agreements or the like. Other variations are possible as well.

As further noted above, a representative UE could be battery powered, having a battery that stores energy for powering various operations, including but not limited to the UE's monitoring for scheduling directives and the UE's transmission and reception of data in scheduled PRBs. The UE's battery could be rated or configured to store up to a maximum amount of energy, which could be measured in units of energy such as ampere-hours (Ah), milliampere-hours (mAh), voltage (V), or the like. And as the UE consumes this battery energy, at any given time the UE will have a remaining battery energy level defining the amount of energy remaining in the UE's battery. This remaining battery energy level could be quantified as a number of units of energy and/or as a percentage of the battery's maximum energy capacity, among other possibilities.

In line with the discussion above, when such a battery powered UE operates with EN-DC rather than 4G-only or 5G-only connectivity, the EN-DC operation could contribute to drain of the UE's battery energy. Namely, EN-DC operation may require the UE to concurrently use both its 4G radio and its 5G radio, each with associated RF circuitry, to regularly monitor both the UE's 4G connection and the UE's 5G connection and to engage in active communication on both connections, which may consume more of the UE's battery energy (e.g., at a greater rate) than the UE's operation with 4G-only connectivity or 5G-only connectivity. Further, as noted above, this issue is especially problematic for a UE that has low remaining battery energy in the first place, as the more battery-intensive EN-DC operation could contribute to quicker exhaustion of the UE's battery energy.

When a UE is operating with EN-DC rather than standalone connectivity and the UE has threshold low remaining battery energy, it could be useful increase the UE's air-interface resource scheduling priority in an effort to allocate more PRBs per unit time to the UE than the UE might otherwise receive with its baseline scheduling priority. Allocating more PRBs per unit time to the UE in that state may allow the UE to complete its air-interface communications more quickly, possibly in fewer subframes, which may help conserve the UE's limited remaining battery energy and avoid or defer associated issues.

Accordingly, as noted above, the present disclosure provides that when an access node such as 4G eNB 14 or 5G gNB is serving a UE, the access node will increase the UE's scheduling priority based on a combination of (i) the UE operating with EN-DC rather than standalone connectivity and (ii) the UE having threshold low remaining battery energy.

At issue here is the combination of these two factors rather than just one of these two factors in isolation. To evaluate the combination of factors, the access node could first detect that one of the factors is met, and the access node could then respond to detecting that one factor by next determining whether the other factor is met as well. Upon determining that the other factor is met as well, the access node could thereby conclude that both factors are met. And upon determining in this or another manner that the combination of factors is met, the access node could then use the combination of factors as a basis to increase the UE's scheduling priority.

In an example implementation as discussed above, as the access node is serving the UE, the access node could first determine that the UE has threshold low remaining battery energy, such as that the UE's remaining battery energy is less than 20% or another designated low percentage of the UE's maximum battery capacity.

To facilitate this, the UE could apply a battery-energy monitor to regularly monitor the UE's remaining battery energy, and the UE could report its remaining battery energy to the access node from time to time and/or specifically in response to detecting that the UE's remaining battery energy has reached a predefined threshold low level. The UE could provide such a report to the access node in a IE of an RRC message or within a scheduling request or other message that the UE sends to the access node. The access node could thus determine that the UE's remaining battery energy is threshold low by receiving from the UE such a report indicating that the UE's remaining battery energy is threshold low or indicating a remaining battery energy that the access node determines to be threshold low.

In response to determining that the UE's remaining battery energy is threshold low, the access node could then further determine whether the UE is served with EN-DC or is rather served with SA connectivity. To facilitate this, the access node could refer to its context record for the UE, which as noted above could indicate whether the UE is served with EN-DC. And if the access node thereby determines that the UE is currently served with EN-DC, the access node could thereby conclude that that both (i) the UE has threshold low remaining battery energy and (ii) the UE is served with EN-DC rather than with SA connectivity.

Based at least on the combined factors of the UE having threshold low remaining battery energy and the UE being served with EN-DC rather than with SA connectivity, the access node could then increase the UE's scheduling priority above the UE's baseline scheduling priority and could then proceed to serve the UE with the increased scheduling priority.

By way of example, if the UE's baseline scheduling priority would have the access node allocating to the UE a particular number of PRBs per unit time, increasing the UE's scheduling priority might involve the access node transitioning to a mode in which the access node will allocate to the UE a greater number of PRBs per unit time. Further, this increase could be by way of comparison with other similarly situated UEs, such as one or more other UEs having data-communication requirements, service level, and channel quality similar to the UE at issue. While the UE might normally have largely the same PRB scheduling priority as those other UEs, increasing the UE's scheduling priority in response to the combined factors presently at issue could result in the access node then serving the UE with higher scheduling priority than those other UEs.

In practice, the access node might also apply one or more other factors in addition to this combination of factors as a basis to trigger increasing the UE's scheduling priority. Therefore, the increase in the UE's scheduling priority would be at least based on the combined factors of the UE having threshold low remaining battery energy and the UE being served with EN-DC rather than with standalone connectivity.

Figure 2:
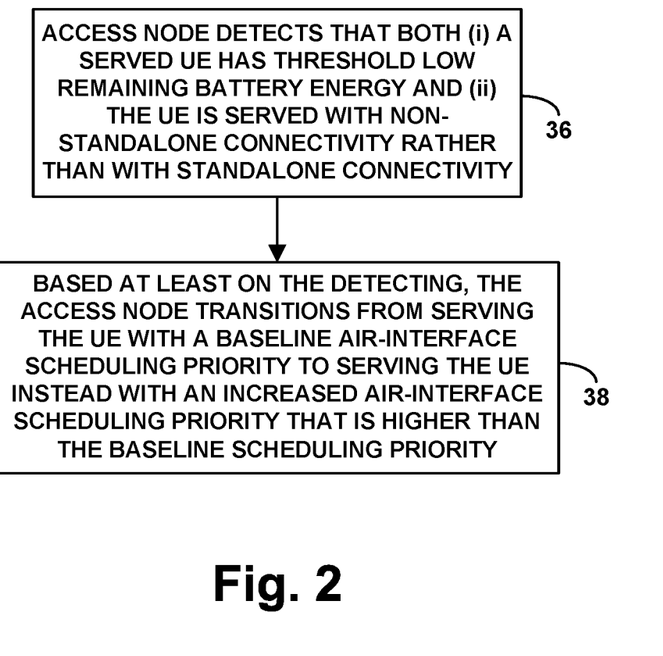
FIG. 2 is a flow chart depicting an example method in accordance with the disclosure.

FIG. 2 is a flow chart depicting a method to control air-interface-resource scheduling priority of a UE served by an access node over an air interface, the air interface defining air-interface resources allocable by the access node. As shown in FIG. 2, at block 36, the method includes the access node detecting that both (i) the UE has threshold low remaining battery energy and (ii) the UE is served with non-standalone connectivity rather than with standalone connectivity. And at block 38, the method includes, based at least on the detecting, the access node transitioning from serving the UE with a baseline air-interface scheduling priority to serving the UE instead with an increased air-interface scheduling priority that is higher than the baseline scheduling priority.

In line with the discussion above, the act of detecting that the UE has threshold low remaining battery energy could involve receiving from the UE a report indicating that the UE has at least predefined threshold low remaining battery energy, with the detecting being based on the received report. Or the act could involve receiving from the UE a report of remaining battery energy of the UE and determining that the reported remaining battery energy is at least predefined threshold low. Further, the threshold low energy could be a threshold low percentage of the maximum energy capacity of the UE's battery.

In addition, as discussed above, the standalone connectivity could involve the UE being connected with the access node under a first RAT and not being concurrently connected under a second RAT, and the non-standalone connectivity could involve the UE being connected concurrently with the access node under the first RAT and with another access node under a second RAT. And here the first RAT might be 4G LTE or 5G NR, the second RAT might be the other of 4G LTE and 5G NR, and the non-standalone connectivity could be EN-C).

Further, as discussed above, the air-interface resources could include PRBs, and the act of the access node transitioning from serving the UE with the baseline air-interface scheduling priority to serving the UE instead with the increased air-interface scheduling priority could involve the access node increasing a rate of PRB allocation to the UE.

And still further, as discussed above, the act of the access node detecting that both the UE has threshold low remaining battery energy and the UE is served with non-standalone connectivity rather than with standalone connectivity could involve the access node first determining that the UE has threshold low remaining battery energy and then, responsive to the access node determining that the UE has threshold low remaining battery energy, the access node making a determination of whether the UE is served with non-standalone connectivity or rather with standalone connectivity, the determination being that the UE is served with non-standalone connectivity rather than standalone connectivity.

Figure 3:
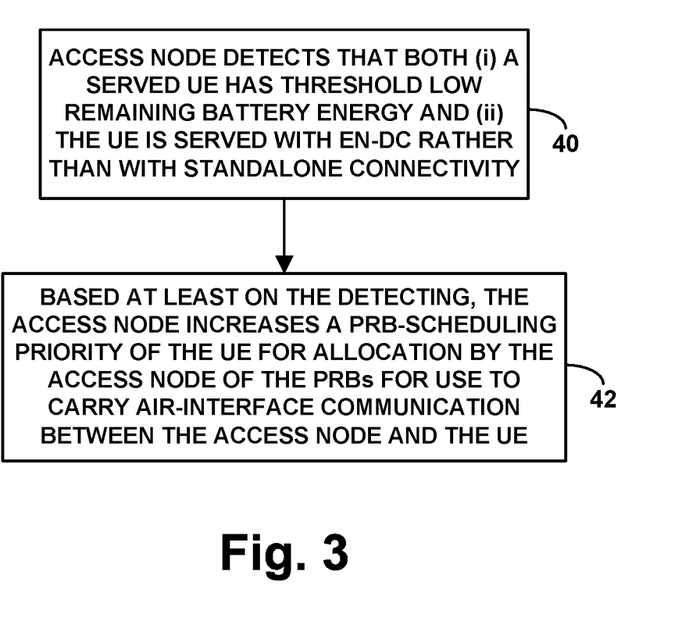
FIG. 3 is another flow chart depicting an example method in accordance with the disclosure.

FIG. 3 is next a flow chart depicting a method to control air-interface-resource scheduling priority of a UE served by an access node over an air interface, the air interface having a bandwidth and defining a plurality of PRBs allocable by the access node. As shown in FIG. 2, at block 40, the method includes the access node detecting that both (i) the UE has threshold low remaining battery energy and (ii) the UE is served with EN-DC rather than with standalone connectivity. And at block 42, the method includes, based at least on the detecting, the access node increasing a PRB-scheduling priority of the UE for allocation by the access node of the PRBs for use to carry air-interface communication between the access node and the UE.

Various features described above can be applied in this context as well, and vice versa.

For example, the act of the access node detecting that the UE has threshold low remaining battery energy is based on a battery-energy report received from the UE. And the act of the access node detecting that both the UE has threshold low remaining battery energy and the UE is served with EN-DC rather than standalone connectivity could involve (i) the access node determining that the UE has threshold low remaining battery energy and (ii) responsive to the access node determining that the UE has threshold low remaining battery energy, the access node referring to context data for the UE to determine whether the UE is served with EN-DC rather than standalone connectivity.

Further, the access node in this scenario could serve the UE over a 4G LTE connection, and the act of determining whether the UE is served with EN-DC rather than standalone connectivity could involve determining whether the UE is concurrently served by another access node over a 5G NR connection. Or the access node could serve the UE over a 5G NR connection, and the act of determining whether the UE is served with EN-DC rather than standalone connectivity could involve determining whether the UE is concurrently served by another access node over a 4G LTE connection.

Figure 4:
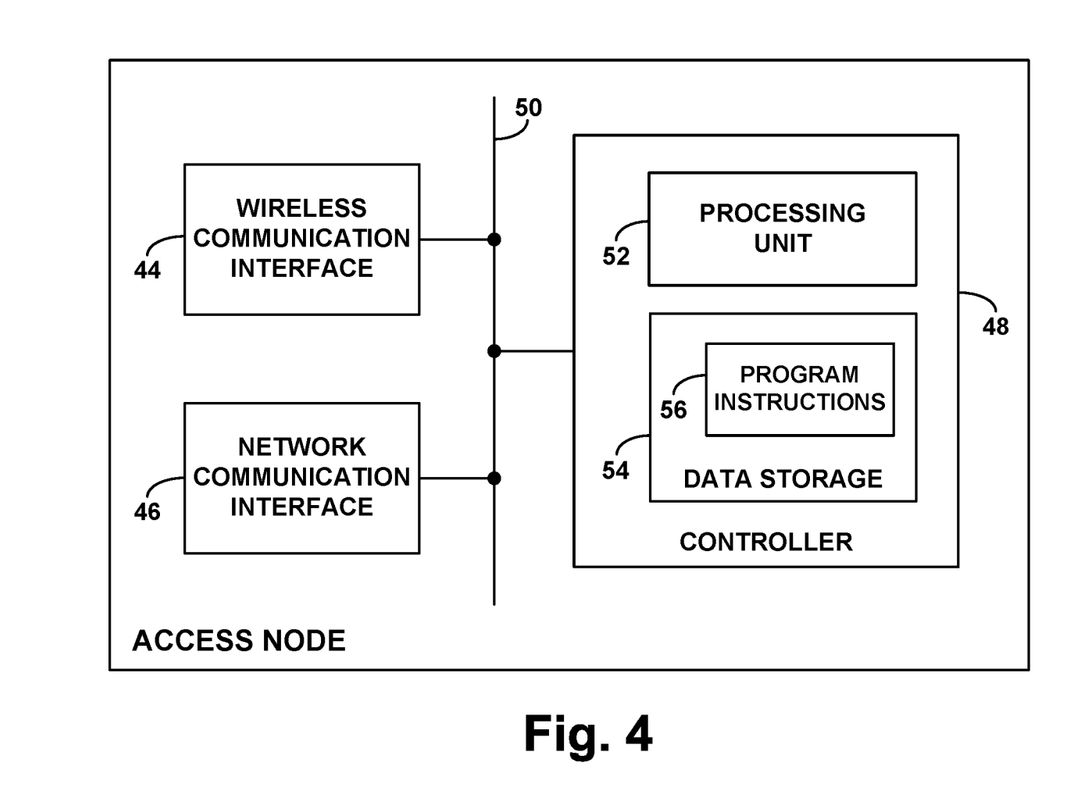
FIG. 4 is a simplified block diagram of an example access node operable in accordance with the disclosure.

FIG. 4 is next a simplified block diagram of an access node that could operate in accordance with the present disclosure. As shown, the example access node includes a wireless communication interface 44 a network communication interface 46, and a controller 48, all of which may be communicatively linked together by a system bus, network, or other connection mechanism 50.

In this example access node, the wireless communication interface 44 could comprise an antenna structure, which could be tower mounted or could take other forms, and associated components such as a power amplifier and a wireless transceiver, so as to facilitate providing a coverage area defining an air interface having a downlink and an uplink, and engaging in transmission and reception of user-plane data and control-plane signaling over the air interface in accordance with the representative RAT. And the network communication interface 46 could comprise a wired or wireless interface, such as an Ethernet network communication interface, configured to support communication with other entities, such as with the other access node and various core-network entities.

Further, controller 48 could comprise at least one processing (e.g., one or more general purpose processors and/or specialized processors) 52 programmed to cause the access node to carry out various operations such as those discussed herein. For instance, the controller could comprise at least one non-transitory data storage (e.g., one or more magnetic, optical, or flash storage components) 54 holding program instructions 56 executable by the at least one processing unit 42 to cause the access node to carry out such operations.

Various other features discussed herein can be implemented in this context as well, and vice versa.

Figure 5:
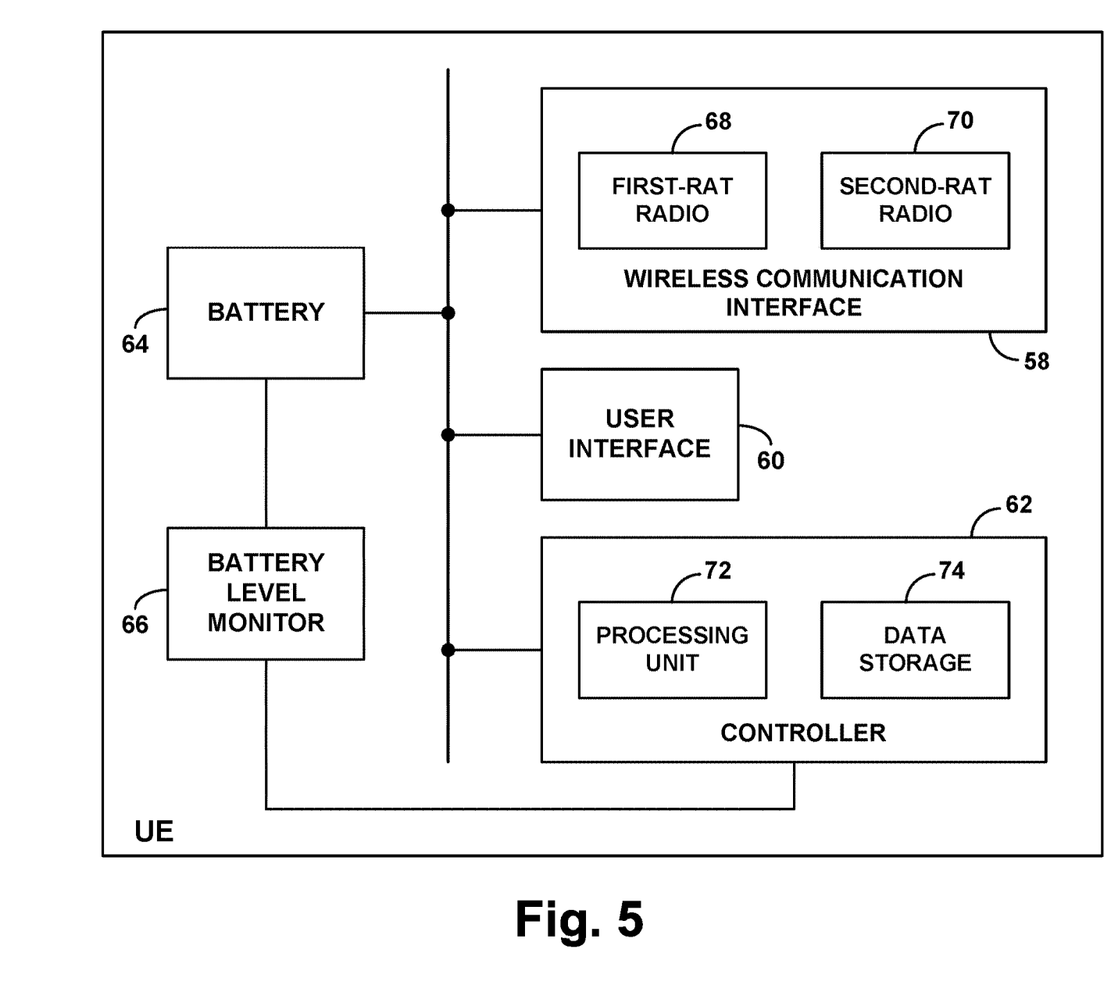
FIG. 5 is a simplified block diagram of an example UE operable in accordance with the disclosure.

Finally, FIG. 5 is a simplified block diagram of an example UE, showing some of the components that could be included to facilitate carrying out operations as described herein.

As shown in FIG. 5, the example UE includes a wireless communication interface 58, a user interface 60, a controller 62, a battery 64, and a battery level monitor 66. These components could be interconnected, integrated, and/or communicatively linked together in various ways now known or later developed. For simplicity, the figure generally depicts the battery 64 being interconnected with the wireless communication interface 58, user interface 60, and controller 62, and the figure generally depicts the battery level monitor 66 being interconnected with the battery 64 and the controller 62. Numerous other arrangements are also possible.

Wireless communication interface 58 operates to facilitate air interface communication and may be equipped to support both standalone connectivity and dual connectivity as discussed above. As such, the wireless communication interface is shown including a first-RAT radio 68 (e.g., a 4G LTE radio) and a second-RAT radio 70 (e.g., a 5G NR radio), and the wireless communication interface could include other components (not shown) such as power amplifiers, filters, and antenna structures, to facilitate standalone and dual connectivity operation.

User interface 60, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker.

Controller 62, which could be integrated with wireless communication interface 58 (e.g., on a common chipset) or provided in another manner could operate to carry out or cause the UE to carry out various UE operations described herein. As shown, controller 62 could include a processing unit 72 (e.g., one or more general purpose processors such as microprocessors and/or one or more special purpose processors such as application specific integrated circuits), and non-transitory data storage 74 (e.g., one or more volatile and/or non-volatile storage components, such as magnetic, optical and/or flash storage). And non-transitory data storage 74 could hold program instructions, which could be executable by the processing unit 72 to carry out the various UE operations.

Battery 64 could be configured to provide energy to support operation of the example UE when the example UE is not connected with another energy source, and the battery could be rechargeable. Further, the battery could take various forms, examples of which include nickel metal hydride (NiMH), nickel cadmium (NiCd), Lithium Ion (Li-Ion), and lithium polymer (Li-Poly), or others now known or later developed.

Battery level monitor 66 could operate to regularly monitor the remaining battery energy level of battery 64 and to provide an output signal indicating a latest determined remaining battery energy level, which the processing unit could receive and use in the manner described herein. As such, battery level monitor 66 could take various forms as discussed above, such as a voltmeter or a coulomb counter, among other possibilities. Further, the battery level monitor could be integrated with the battery itself or could be provided separately and interconnected with the battery.

Various features described above can be carried out in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to control air-interface-resource scheduling priority of a user equipment device (UE) served by an access node over an air interface, the air interface defining air-interface resources allocable by the access node, the method comprising:
   detecting by the access node that both (i) the UE has threshold low remaining battery energy and (ii) the UE is served with non-standalone connectivity rather than with standalone connectivity; and
   based at least on the detecting, transitioning by the access node from serving the UE with a baseline air-interface scheduling priority to serving the UE instead with an increased air-interface scheduling priority higher than the baseline scheduling priority.

2. The method of claim 1, wherein detecting that the UE has threshold low remaining battery energy comprises receiving from the UE a report indicating that the UE has at least predefined threshold low remaining battery energy, the detecting being based on the received report.

3. The method of claim 1, wherein detecting that the UE has threshold low remaining battery energy comprises receiving from the UE a report of remaining battery energy of the UE and determining that the reported remaining battery energy is at least predefined threshold low.

4. The method of claim 1, wherein the UE has a battery with a maximum energy capacity, and wherein detecting that the UE has threshold low remaining battery energy comprises determining that remaining energy in the battery is at least as low as a predefined threshold low percentage of the maximum energy capacity.

5. The method of claim 1, wherein the standalone connectivity involves the UE being connected with the access node under a first radio access technology (RAT) and not being concurrently connected under a second RAT, and wherein the non-standalone connectivity involves the UE being connected concurrently with the access node under the first RAT and with another access node under a second RAT.

6. The method of claim 5, wherein the first RAT is one of (i) 4G Long Term Evolution (4G LTE) and 5G New Radio (5G NR), wherein the second RAT is the other of 4G LTE and 5G NR, and wherein the non-standalone connectivity is EUTRA-NR dual connectivity (EN-DC).

7. The method of claim 1, wherein the air-interface resources comprises physical resource blocks (PRBs), and wherein transitioning by the access node from serving the UE with the baseline air-interface scheduling priority to serving the UE instead with the increased air-interface scheduling priority comprises increasing by the access node a rate of PRB allocation to the UE.

8. The method of claim 1, wherein detecting by the access node that both (i) the UE has threshold low remaining battery energy and (ii) the UE is served with non-standalone connectivity rather than with standalone connectivity comprises:
   determining by the access node that the UE has threshold low remaining battery energy; and
   responsive to determining by the access node that the UE has threshold low remaining battery energy, making a determination by the access node of whether the UE is served with non-standalone connectivity or rather with standalone connectivity, the determination being that the UE is served with non-standalone connectivity rather than with standalone connectivity.

9. A method to control air-interface-resource scheduling priority of a user equipment device (UE) served by an access node over an air interface, the air interface having a bandwidth and defining a plurality of physical resource blocks (PRBs) allocable by the access node, the method comprising:
   detecting by the access node that both (i) the UE has threshold low remaining battery energy and (ii) the UE is served with EUTRA-NR dual connectivity (EN-DC) rather than with standalone connectivity;
   based at least on the detecting, increasing by the access node a PRB-scheduling priority of the UE for allocation by the access node of the PRBs for use to carry air-interface communication between the access node and the UE.

10. The method of claim 9, wherein detecting by the access node that the UE has threshold low remaining battery energy is based on a battery-energy report received from the UE.

11. The method of claim 9, wherein detecting by the access node that both (i) the UE has threshold low remaining battery energy and (ii) the UE is served with EN-DC rather than standalone connectivity comprises:
   determining by the access node that the UE has threshold low remaining battery energy; and
   responsive to determining by the access node that the UE has threshold low remaining battery energy, referring by the access node to context data for the UE to determine by the access node whether the UE is served with EN-DC rather than standalone connectivity.

12. The method of claim 9, wherein the access node serves the UE over a 4G Long Term Evolution (4G LTE) connection, and wherein determining whether the UE is served with EN-DC rather than standalone connectivity comprises determining whether the UE is concurrently served by another access node over a 5G New Radio (5G NR) connection.

13. The method of claim 9, wherein the access node serves the UE over a 5G New Radio (5G NR) connection, and wherein determining whether the UE is served with EN-DC rather than standalone connectivity comprises determining whether the UE is concurrently served by another access node over a 4G Long Term Evolution (4G LTE) connection.

14. An access node comprising:
- a wireless communication interface through which to serve user equipment devices (UEs) over an air interface defining a plurality of air-interface resources; and
- a controller, wherein the controller is configured to cause the access node to carry out operations when the access node is serving a UE over the air interface, the operations including:
  - detecting that both (i) the UE has threshold low remaining battery energy and (ii) the UE is served with non-standalone connectivity rather than with standalone connectivity, and
  - based at least on the detecting, transitioning from serving the UE with a baseline air-interface scheduling priority to serving the UE instead with an increased air-interface scheduling priority higher than the baseline scheduling priority.

15. The access node of claim 14, wherein the controller comprises at least one processing unit, at least one non-transitory data storage, and program instructions stored in the at least one non-transitory data storage and executable by the at least one processing unit to cause the access node to carry out the operations.

16. The access node of claim 14, wherein detecting that the UE has threshold low remaining battery energy comprises receiving a battery-level report from the UE.

17. The access node of claim 14, wherein the UE has a battery with a maximum energy capacity, and wherein detecting that the UE has threshold low remaining battery energy comprises determining that remaining energy in the battery is at least as low as a predefined threshold low percentage of the maximum energy capacity.

18. The access node of claim 14, wherein the standalone connectivity involves the UE being connected with the access node under a first radio access technology (RAT) and not being concurrently connected under a second RAT, and wherein the non-standalone connectivity involves the UE being connected concurrently with the access node under the first RAT and with another access node under a second RAT.

19. The access node of claim 14, wherein the air-interface resources comprises physical resource blocks (PRBs), and wherein transitioning by the access node from serving the UE with the baseline air-interface scheduling priority to serving the UE instead with the increased air-interface scheduling priority comprises increasing by the access node a rate of PRB allocation to the UE.

20. The access node of claim 14, wherein detecting that both (i) the UE has threshold low remaining battery energy and (ii) the UE is served with non-standalone connectivity rather than with standalone connectivity comprises:
- determining that the UE has threshold low remaining battery energy; and
- responsive to determining that the UE has threshold low remaining battery energy, making a determination of whether the UE is served with non-standalone connectivity or rather with standalone connectivity, the determination being that the UE is served with non-standalone connectivity rather than with standalone connectivity.

* * * * *